United States Patent
Cariello

(10) Patent No.: US 12,346,582 B2
(45) Date of Patent: Jul. 1, 2025

(54) TECHNIQUES FOR MEMORY SYSTEM REBUILD

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 186 days.

(21) Appl. No.: 17/663,800

(22) Filed: May 17, 2022

(65) Prior Publication Data

US 2023/0376225 A1 Nov. 23, 2023

(51) Int. Cl.
*G06F 3/06* (2006.01)

(52) U.S. Cl.
CPC ............ *G06F 3/064* (2013.01); *G06F 3/0625* (2013.01); *G06F 3/0659* (2013.01); *G06F 3/0679* (2013.01)

(58) Field of Classification Search
CPC ...... G06F 3/0625; G06F 3/064; G06F 3/0659; G06F 3/0679
See application file for complete search history.

(56) References Cited

U.S. PATENT DOCUMENTS

| | | | |
|---|---|---|---|
| 10,990,526 B1 * | 4/2021 | Lam | G06F 12/0246 |
| 2009/0240678 A1 * | 9/2009 | Sadovsky | G06F 16/40 707/999.005 |
| 2009/0265506 A1 * | 10/2009 | Yim | G06F 3/0664 707/999.2 |
| 2013/0339587 A1 * | 12/2013 | Asnaashari | G06F 11/20 711/103 |
| 2020/0285582 A1 * | 9/2020 | Palmer | G06F 12/0868 |
| 2022/0083256 A1 * | 3/2022 | Muthiah | G06F 3/0655 |
| 2022/0244869 A1 * | 8/2022 | Kanteti | G06F 3/0631 |

\* cited by examiner

*Primary Examiner* — Larry T Mackall
(74) *Attorney, Agent, or Firm* — Holland & Hart LLP

(57) ABSTRACT

Methods, systems, and devices for techniques for memory system rebuild are described. In some cases, a memory system may store an indication of whether data stored to one or more physical addresses is sequential using metadata associated with the one or more physical addresses. For metadata corresponding to a beginning physical address, the memory system may store an indication of a quantity of physical addresses subsequent to the beginning physical address with sequential corresponding logical addresses. Additionally or alternatively, the memory system may store an indication of a quantity of physical addresses preceding a last physical address with sequential corresponding logical addresses. During a rebuild operation, the memory system may read the stored indication and may rebuild an address mapping algorithmically using the stored indication.

17 Claims, 8 Drawing Sheets

TECHNIQUES FOR MEMORY SYSTEM REBUILD

FIELD OF TECHNOLOGY

The following relates to one or more systems for memory, including techniques for memory system rebuild.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may support a sequential write mode. In the sequential write mode, the memory system may receive a set of write commands from a host that are associated with a corresponding set of data having sequential addressing. For example, the set of write commands may be associated with a sequential set of logical addresses, each command of the set of write commands may include a same size of data, or both. While in the sequential write mode, the memory system may reduce overhead associated with performing the set of write commands, such as by performing a block pre-erase operation, by compressing an address mapping between logical addresses and physical addresses, or both, and accordingly improve system performance (e.g., reduce system latency, increase bandwidth, reduce power consumption or any combination thereof). In order to rebuild the address mapping after an asynchronous power loss, some memory systems may be configured to periodically store a checkpoint which includes an indication of a last valid address mapping, an indication of a last written page of memory cells, or both. In some cases, storing the checkpoint may consume significant system resources, such as time used to store the indications. Accordingly, techniques to reduce overhead associated with a sequential write mode are desired.

As described herein, a memory system may store an indication of whether data stored to one or more physical addresses is sequential using metadata associated with the one or more physical addresses. For example, for metadata corresponding to a beginning physical address, the memory system may store an indication of a quantity of physical addresses subsequent to the beginning physical address with sequential corresponding logical addresses. Additionally or alternatively, for metadata corresponding to a last physical address. the memory system may store an indication of a quantity of physical addresses preceding the last physical address with sequential corresponding logical addresses. Accordingly, during a rebuild operation, the memory system may read the stored indication and may rebuild the address mapping algorithmically using the stored indication. Thus, the memory system may rebuild the address mapping without accessing metadata or logical address information for each physical address, which may improve system efficiency by reducing consumption of system resources, such as computation time, power usage, or both associated with rebuilding the address mapping.

Figure 1:
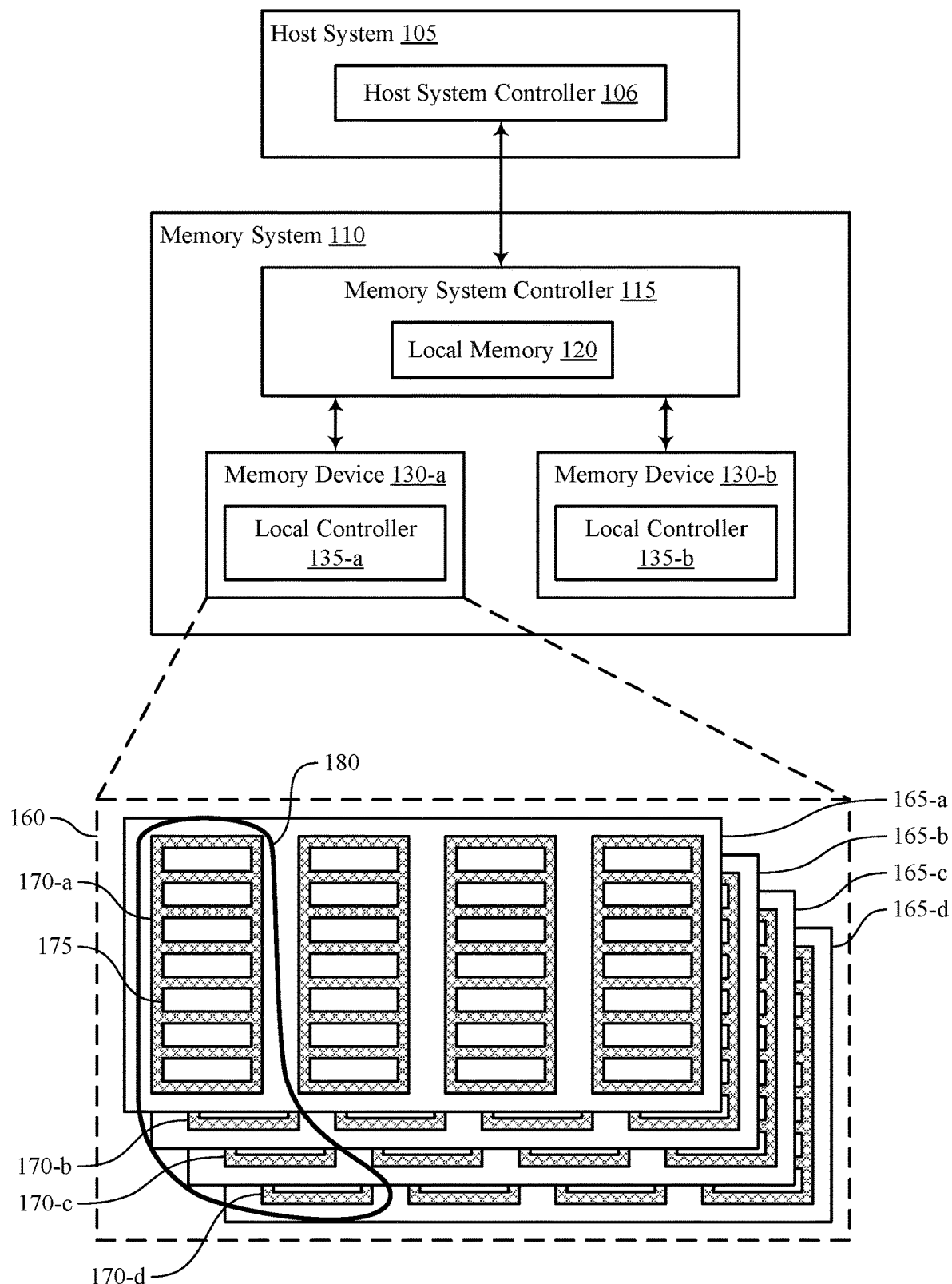
FIG. 1 illustrates an example of a system that supports techniques for memory system rebuild in accordance with examples as disclosed herein.
Figure 2:
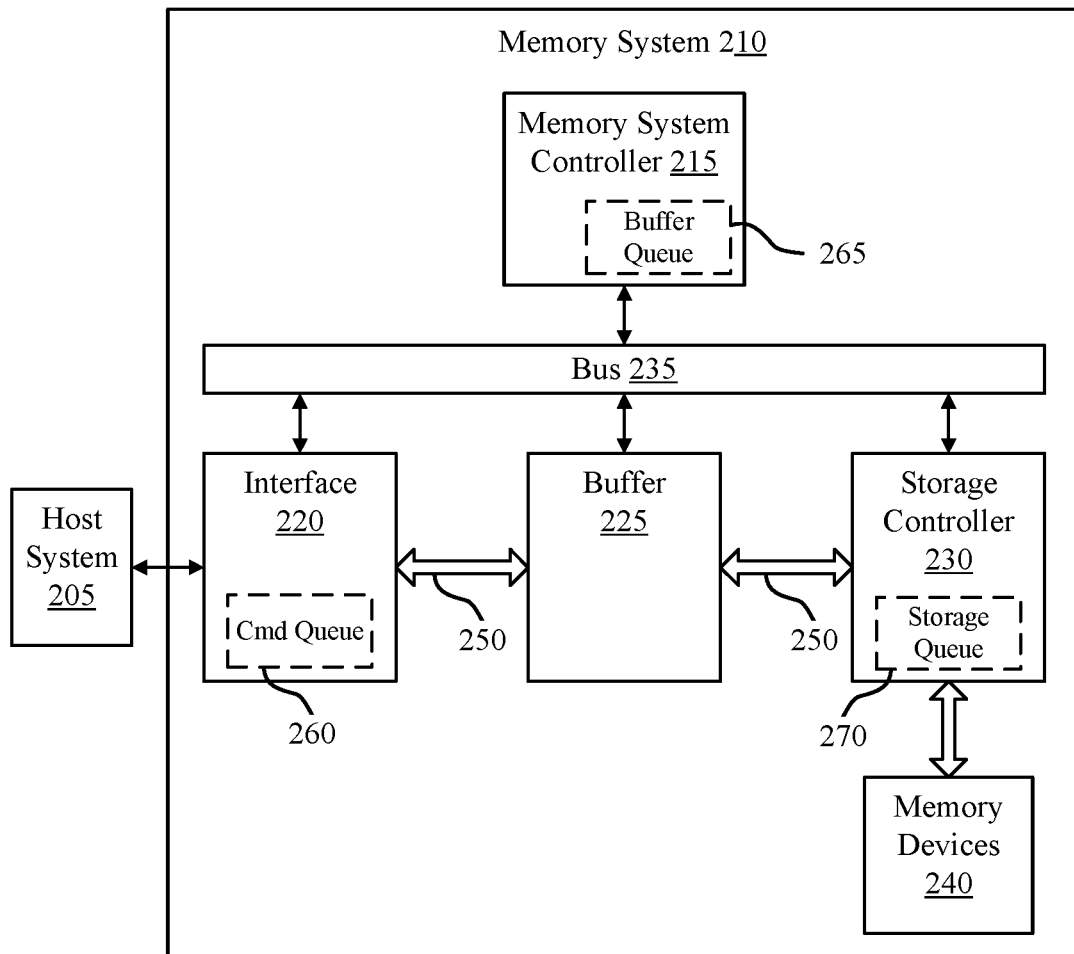
FIG. 2 illustrates an example of a system that supports techniques for memory system rebuild in accordance with examples as disclosed herein.

Features of the disclosure are initially described in the context of systems, devices, and circuits with reference to FIGS. 1 through 2. Features of the disclosure are described in the context of a system, a set of memory dies, and a process flow with reference to FIGS. 3-5. These and other features of the disclosure are further illustrated by and described in the context of an apparatus diagram and flowchart that relate to techniques for memory system rebuild with reference to FIGS. 6-8.

FIG. 1 illustrates an example of a system 100 that supports techniques for memory system rebuild in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support techniques for memory system rebuild. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory system 110 may store an indication of whether data stored to one or more physical addresses is sequential using metadata associated with the one or more physical addresses. For example, for metadata corresponding to a beginning physical address, the memory system 110 may store an indication of a quantity of physical addresses subsequent to the beginning physical address with sequential corresponding logical addresses. Additionally or alternatively, the memory system 110 may store an indication of a quantity of physical addresses preceding a last physical address with sequential corresponding logical addresses. Accordingly, during a rebuild operation, the memory system 110 may read the stored indication and may rebuild an L2P mapping table algorithmically using the stored indication. Thus, the memory system may rebuild the L2P mapping table without accessing metadata for each physical address, which may improve system efficiency by reducing consumption of system resources, such as computation time, power usage, or both associated with rebuilding the address mapping.

FIG. 2 illustrates an example of a system 200 that supports techniques for memory system rebuild in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, a memory system 210 may store an indication of whether data stored to one or more physical addresses is sequential using metadata associated with the one or more physical addresses. For example, for metadata corresponding to a beginning physical address, the memory system 210 may store an indication of a quantity of physical addresses subsequent to the beginning physical address with sequential corresponding logical addresses. Additionally or alternatively, the memory system 210 may store an indication of a quantity of physical addresses preceding a last physical address with sequential corresponding logical addresses. Accordingly, during a rebuild operation, the memory system 210 may read the stored indication and may rebuild an L2P mapping table algorithmically using the stored indication. Thus, the memory system may rebuild the L2P mapping table without accessing metadata or logical address information for each physical address, which may improve system efficiency by reducing consumption of system resources, such as computation time, power usage, or both associated with rebuilding the address mapping.

Figure 3:
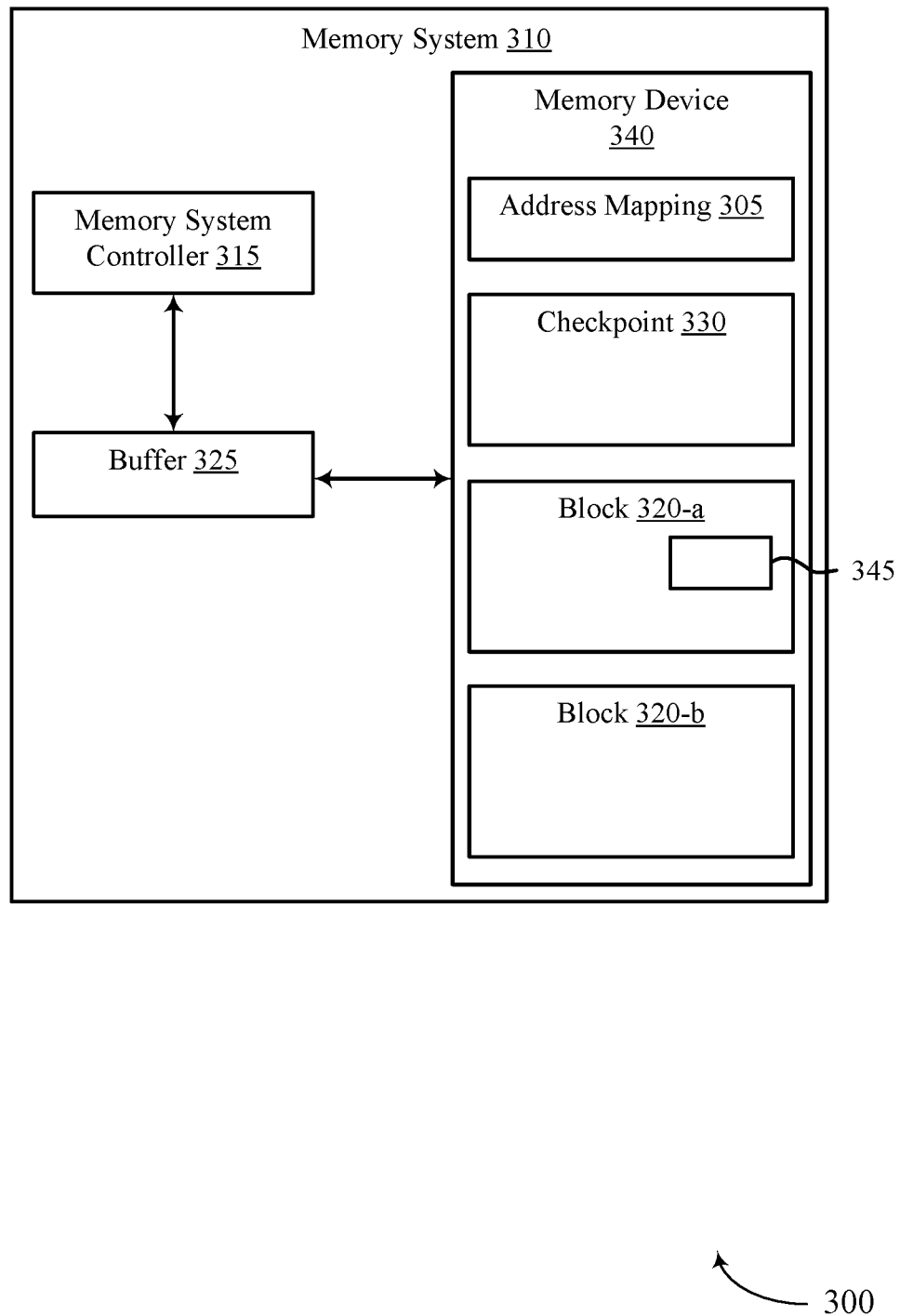
FIG. 3 illustrates an example of a system that supports techniques for memory system rebuild in accordance with examples as disclosed herein.

FIG. 3 illustrates an example of a system 300 that supports techniques for memory system rebuild in accordance with examples as disclosed herein. The system 300 may include a memory system 310 configured to perform access operations, such as read operations or write operations, associated with data from a host system, which may be examples of the corresponding devices as described with reference to FIGS. 1 and 2. The host system and the memory system 310 may perform a sequential access operation, such as a sequential write operation to store or modify data stored in one or more memory device 340. The memory system 310 may include a memory system controller 315, which may be configured to control or perform aspects or operations associated with access operations or other functions of the memory system 310.

The memory system 310 may receive one or more write commands from the host system. Each write command of the one or more write commands may include or be associated with a respective set of data from the host system, as well as respective metadata 345, such as a size of the respective data, a logical address associated with the data, or both. The memory system 310 may temporarily store data associated with a write command, as well as the associated metadata 345, in volatile storage of the memory system 310, such as in a buffer 325, prior to transferring the data to a block of memory cells of the memory device 340, such as a block of memory cells 320-a or a block of memory cells 320-b. In some cases, the memory system 310 may program a subset the data, along with the metadata 345, to a same set of memory cells corresponding to a physical address of the block of memory cells 320-a or 320-b, such as to page of memory cells.

In some cases, the one or more write commands may be associated with a sequential write mode. For example, the one or more write commands may be for data associated with a large file, and may be associated with a continuous range of logical address. In some examples, the memory system 310 may write the data to sequential physical addresses. If the memory system 310 determines that the one or more write commands are part of a sequential write, the memory system 310 may enter the sequential write mode. Because the one or more write commands are associated with a continuous range of logical addresses and physical addresses, the memory system 310 may reduce overhead associated with storing data associated with the one or more write commands. In some examples, the sequential write mode may be an accelerated write mode, such as a write mode associated with writing to single level cells (e.g., SLC) instead of multi-level cells (e.g., TLC cells, QLC cells).

The memory system 310 may determine whether the one or more write commands are part of the sequential write mode based on whether a metric associated with the one or more write commands satisfies a threshold. For example, if a size of data associated with a quantity of the one or more write commands corresponds to a maximum size of data for a write command (e.g., a size of data associated with the one or more write commands satisfies a sequential write threshold), the memory system 310 may determine that the one or more write commands are part of the sequential write mode. Additionally or alternatively, the memory system 310 may determine whether the one or more write commands are associated with the sequential write mode if a threshold quantity of the one or more write commands are sequential. For example, a first command and a second command of the one or more write commands may be sequential if the logical addresses of the second command are sequential with the logical addresses of the first command (e.g., if the first command includes logical addresses of 0 through 511, while the second command includes logical addresses 512-1023, the first command and the second command may be sequential).

In some cases, the memory system 310 may store an indication that the data is sequential in the associated metadata 345 for the data. For example, a first command of the one or more commands may include data to be written to a plurality of physical addresses. In some cases, each physical address may be associated with a physical transfer units (PTU). Accordingly, metadata 345 associated with a first physical address may include an indication of the quantity of physical addresses of the plurality which are associated with sequential logical addresses. For example, a first command of the one or more commands may include a continuous range of logical addresses. Accordingly, metadata 345 associated with data stored at a first physical addresses corresponding to a first logical address of the continuous range of physical addresses may include an indication of the quantity of logical addresses or physical addresses subsequent to the first physical address indicated by the first command.

In some cases, the memory system 310 may check the buffer 325 for additional commands of the one or more commands to determine whether a second command includes sequential data (e.g., sequential to data associated with the first command). Accordingly, the memory system 310 may include an indication of the sequential data of the second command in the metadata 345 associated with the first command, for example my incrementing the quantity of physical addresses which are sequential. In some cases, such a scheme may be referred to as forward reconstruction, because the metadata 345 includes an indication of sequential data subsequent to (e.g., forward-looking) a particular physical address. However, in forward reconstruction, the memory system 310 may not have determined an extent of the number of logical addresses associated with a sequential write operation at the time of storing a first PTU of the sequential data, and thus an APL rebuild for forward reconstruction may read metadata associated with multiple physical addresses of the sequential data during the APL rebuild.

Additionally or alternatively, metadata 345 associated with a first command of the one or more commands may include an indication of sequential data previously written to the memory system (e.g., data written to earlier physical addresses). For example, metadata 345 associated with a first physical address may include an indication of the quantity of physical addresses associated with the sequential data preceding the first physical address. In some cases, the memory system 310 may include a counter tracking the quantity. Accordingly, as part of storing data to the first physical address, the memory system 310 may increment a value of the counter, such that metadata 345 associated with a subsequent write command may use the updated counter value. In some cases, such a scheme may be referred to as backward reconstruction, because the metadata 345 includes an indication of sequential data previous to (e.g., backward-looking) a particular physical address.

As part of performing a write command, the memory system 310 may update an address mapping 305 between physical addresses and logical addresses (e.g., an L2P table) to include a mapping between the physical location of the data (e.g., the physical address of the data in the block of memory cells 320-a or 320-b) and the associated logical address. In some cases, the address mapping 305 may be stored in non-volatile memory of the memory device 340, such as in a block of memory cells. Thus, updating the address mapping 305 may be a relatively resource intensive operation.

Accordingly, prior to updating the address mapping 305, the memory system 310 may store an indication of the data associated with the write command, along with an indication of the associated metadata 345, such as the logical address of the data, the size of the data, or both, in the buffer 325, for example in a change log. In some cases, if a quantity of stored indications has satisfied a threshold (e.g., if the change log is full), the memory system may initiate storing a checkpoint 330. As part of storing the checkpoint 330, the memory system 310 may update the address mapping 305 to include or update the mapping between logical addresses and physical addresses of the data associated with the stored indications (e.g., the data indicated in the change log).

In some cases, updating the address mapping 305 may include adjusting a previously stored L2P table, such as by modifying, adding, or removing entries. Additionally or alternatively, updating the address mapping 305 may include storing a new L2P table. In such cases, the memory system may store an indication that the updated address mapping 305 (e.g., the new L2P table) is a valid address mapping 305. As part of storing the checkpoint 330, the memory system 310 may store an indication of a page of memory cells to which the memory system 310 has written data, such as a logical address of the last written page of data.

In some cases, updating the address mapping 305 and storing data in the blocks 320-a, 320-b, or both may be asynchronous. For example, the memory system 310 may store the data in the memory device 340 (e.g., in the block of memory cells 320-a or the block of memory cells 320-b) prior to updating the address mapping 305, such that information associated with the logical addresses of the data may be stored in the buffer 325 (e.g., in the change log). However, if the memory system 310 undergoes an unexpected power event (e.g., asynchronous power loss), the information associated with the logical addresses of the data stored in the buffer 325 may be lost or corrupted. In addition, because the change log was not written to the address mapping 305, the address mapping 305 may not accurately represent data stored in the blocks of memory cells 320 after the unexpected power event.

Accordingly, after powering on, the memory system 310 may perform an operation to repair or rebuild the address mapping 305, such as an asynchronous power loss (APL) rebuild operation. As part of the APL rebuild operation, the memory system 310 may read the last stored checkpoint 330 (e.g., the most recent checkpoint 330 stored prior the power loss) to determine the valid address mapping 305 (e.g., a latest updated address mapping 305) and the logical address of the last written page associated with the checkpoint 330. Subsequently, the memory system 310 may determine logical addresses of data stored after the checkpoint 330, for example by reading each page of memory cells with physical addresses subsequent to the physical address of the last written page associated with the checkpoint included in an open block (e.g., the block of memory cells 320-b) to determine whether data has been stored in the subsequent pages of memory cells. Because the memory system 310 may use the stored logical address of the last written page as a starting point for rebuilding the address mapping 305, the physical address of the last written page may be referred to as a starting address (and may store an associated starting logical address). In some cases, using metadata 345 stored along with the data, the memory system 310 may recover the associated logical addresses and thus rebuild or recover the address mapping 305.

In some cases, as part of the APL rebuild operation, the memory system may determine whether data stored after the checkpoint 330 is sequential (e.g., stored as part of a sequential write mode) using the metadata 345. For example, as part of a forward reconstruction scheme, the memory system 310 may read the stored metadata 345 of a first physical address to determine a quantity of physical addresses subsequent to the first physical address storing data associated with sequential logical addresses. Accordingly, the memory system may determine (e.g., generate) the logical addresses associated with the physical addresses subsequent to the first physical address algorithmically (e.g., without reading the metadata 345 of each of the subsequent physical addresses). In some cases, if the metadata 345 of the first physical address includes an indication that the first physical address corresponds to a starting logical boundary, the memory system 310 may jump to the associated ending logical boundary, and may determine the logical addresses corresponding to the intermediate physical addresses algorithmically.

Additionally or alternatively, the memory system 310 may use a backward reconstruction scheme. As part of the of the backward reconstruction scheme, the memory system may first determine an ending physical address, corresponding to the last written page of memory cells before the asynchronous power loss, and begin the APL reconstruction "backwards" (e.g., by first reading the metadata 345 of the ending physical address, then reading the metadata 345 of a physical address preceding the ending physical address, and so on). In some cases, the memory system 310 may read metadata 345 for a first physical address to determine a stored indication of the quantity of physical addresses associated with the sequential data preceding the first physical address. Accordingly, the memory system may determine (e.g., generate) the logical addresses associated with data stored in the physical addresses preceding the first physical address algorithmically (e.g., without reading the metadata 345 of each of the preceding physical addresses). In some cases, if the metadata 345 of the first physical address includes an indication that the first physical address corresponds to an ending logical boundary, the memory system 310 may jump to the associated starting logical boundary, and may determine the logical addresses corresponding to the intermediate physical addresses algorithmically. In some cases, the backward reconstruction scheme may improve efficiency of an APL rebuild operation because a full extent of a sequential write operation may be determined at an end of the sequential write operation. Thus, reading metadata 345 associated with an ending physical address of the sequential write operation may indicate the number of physical addresses that were written as part of the sequential write operation.

In some cases, the memory system 310 may compress one or more portions of the address mapping 305 containing sequential data. For example, the address mapping 305 may include one or more layers or sections corresponding to regions or "chunks" of the physical addresses of a block of memory cells 320. Each region may include a starting logical boundary and an ending logical boundary, corresponding to the beginning and end of the region, respectively. In some cases, if data written to each page of memory cells in a region is sequential, the memory system 310 may compress the address mapping 305 by storing a flag or other indicator indicating that the data stored in the region is sequential. Accordingly, the address mapping 305 may not include a mapping between physical addresses and logical addresses for each physical address in the region. Instead, the address mapping 305 may include a mapping for the starting logical boundary, the ending logical boundary, or both, and the memory system 310 may use the mapping of the starting logical boundary, ending logical boundary, or both, along with the indication that the intermediate data is sequential, to determine mappings for the intermediate data. Thus, the address mapping 305 may use less memory (e.g., may be smaller) after compression.

Figure 4:
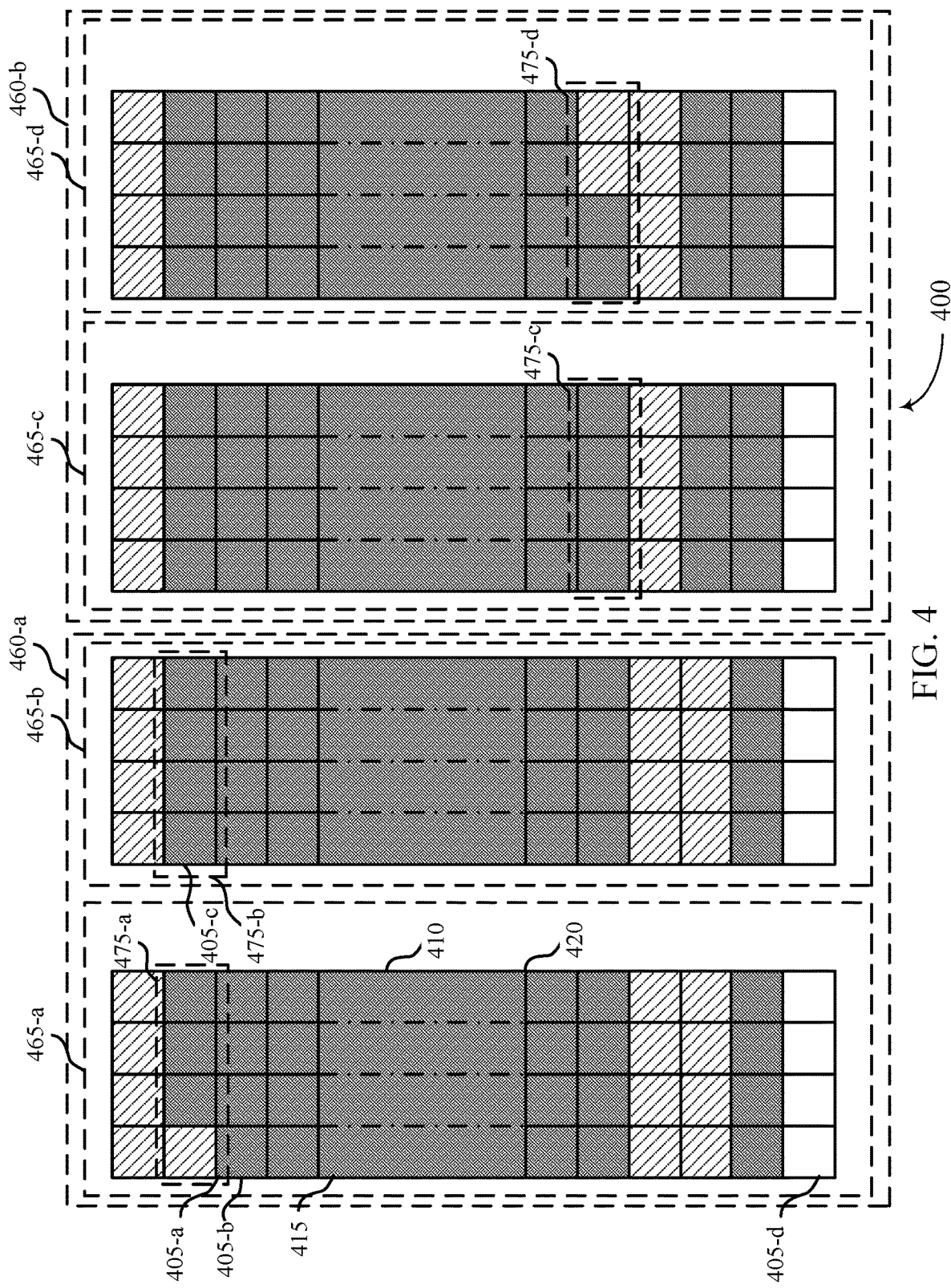
FIG. 4 illustrates an example of a set of memory dies that supports techniques for memory system rebuild in accordance with examples as disclosed herein.

FIG. 4 illustrates an example of a set of memory dies 400 that supports techniques for memory system rebuild in accordance with examples as disclosed herein. The set of memory dies 400 may be associated a memory device or memory system, such as the memory system, 110, 210, or 310 as described with reference to FIGS. 1 through 3, and may include a first memory die 460-*a* and a second memory die 460-*b*, which may each be an example of the memory die 160 as described with reference to FIG. 1. Each memory die 460 may be include a quantity of planes 465, which may be examples of a plane 165 as described with reference to FIG. 1. For example, the first memory die 460-*a* may include a first plane 465-*a* and a second plane 465-*b*, while the second memory dies 460-*b* may include a third plane 465-*c* and a fourth plane 465-*d*.

Each plane 465 may include or may be a quantity of blocks of memory cells, each of which may include or may be a set of pages 475 of memory cells for storing data from a host system. In some cases, a page of memory cells 475 may correspond to a plurality of PTUs or physical addresses 405. In an illustrative, non-limiting example, the page 475-*a* may include four physical addresses 405, although one skilled in the art may recognize that other quantities are possible.

A set of physical addresses 405 may correspond to sequential or non-sequential data. For example, the physical address 405-*a* may include non-sequential data, such as data written as part of a random stream. That is, the logical addresses corresponding to the physical address 405-*a* may not be sequential with logical addresses corresponding to physical addresses 405 preceding or subsequent to physical addresses 405. Additionally or alternatively, the physical address 405-*b* may correspond to sequential data, such as data written as part of a sequential write mode. As discussed with reference to FIG. 3, the physical address 405-*b* may include metadata indicating a quantity of physical addresses 405 subsequent to the physical address 405-*b* storing sequential logical addresses. In some cases, the first memory die 460-*a*, the second memory die 460-*b*, or both may include one or more empty physical addresses (e.g., physical addresses to which data has not been written), such as the empty physical address 405-*d*.

In some cases, a beginning of a sequential stream may not correspond to a beginning of a page 475. For example, a first physical address 405 of the page 475-*a* may be the non-sequential physical address 405-*a*, while the other physical addresses 405 of the page 475-*a* may be examples of sequential physical addresses 405. In some cases, the memory system may determine whether a beginning of a sequential stream corresponds to a beginning of a page 475 using a distributed forward count, a distributed backward count, or both of the starting physical address of a page 475. The distributed forward count for a physical address 405 may indicate a quantity of physical addresses 405 of the page 475 subsequent to the starting physical address 405 with logical addresses sequential to the logical address of the starting physical page 405. The distributed backward count for a physical address 405 may indicate a quantity of physical addresses 405 of the page 475 preceding the starting physical address 405 with logical addresses sequential to the logical address of the starting physical page 405. Accordingly, if the distributed forward count of a physical address is equal to zero, the memory system may determine that a beginning of a sequential stream does not correspond to a beginning of a page 475. In such cases, the memory system may not include an indication of a quantity of sequential physical addresses 405 in the metadata of the other physical addresses. Instead, the memory system may include the indication of a quantity of sequential physical addresses 405 in the metadata of a starting physical address 405-*c* of the page 475-*b*, which may reduce the amount or size of metadata used to perform forward reconstruction, backward reconstruction, or both.

Additionally or alternatively, the indication of the quantity of sequential physical addresses 405 may be stored on a page basis. For example, an ending of a sequential stream may not correspond to an end of a page 475. As illustrated in FIG. 4, a last physical address 405 of the page 475-*d* may be a non-sequential physical address 405, while at least a portion of the other physical addresses 405 of the page 475-*d* may be examples of sequential physical addresses 405. In some cases, the memory system may determine whether an ending of a sequential stream corresponds to an ending of a page 475 using a distributed forward count, a distributed backward count, or both of the starting physical address of a page 475. Accordingly, if the distributed backward count of an ending physical address of the page 475-*d* is equal to zero, the memory system may determine that an ending of a sequential stream does not correspond to an ending of the page 475-*d*. In such cases, the memory system may not include an indication of a quantity of sequential physical addresses 405 in the metadata of the other physical addresses of the page 475-*d*. Instead, the memory system may include the indication of a quantity of sequential physical addresses 405 in the metadata of an ending physical address 405 of the page 475-*c*, which may reduce the amount or size of metadata used to perform forward reconstruction, backward reconstruction, or both.

The set of dies 400 may further illustrate a starting physical address 415 and an ending physical address 420 for a sequential block of intermediate physical addresses 410 of an address mapping between the physical addresses 405 and the corresponding logical addresses, such as the address mapping 305 as described with reference to FIG. 3. In some cases, the memory system may compress the address mapping if the logical addresses associated with the sequential block of intermediate physical addresses 410 are sequential. Accordingly, the address mapping associated with the set of dies 400 may include a mapping for the starting logical boundary and associated physical address, a mapping for the ending logical boundary and associated physical address, or both. Additionally, the address mapping may include an indication of a size or quantity of physical addresses of the intermediate physical addresses 410. In some examples, the memory system may compress the address mapping as part of an APL rebuild operation.

In some cases, as part of the APL rebuild operation, the memory system may determine whether data stored after a checkpoint is sequential using metadata stored in a physical address 405. For example, as part of a forward reconstruction scheme, the memory system may read a checkpoint to determine a last written page before the checkpoint, such as the page 475-*a*. The memory system may then begin sequentially reading metadata associated with each physical address 405 of the page 475-*a* to determine the corresponding logical addresses. In some cases, if the metadata of a physical address 405 includes an indication of sequential data, such as a quantity of subsequent sequential physical addresses 405, the memory system may refrain from reading metadata associated with the subsequent sequential physical addresses, and instead generate the corresponding logical addresses algorithmically. In some cases, if the metadata of a physical address 405 includes an indication that the physical address 405 corresponds to a starting logical boundary 415, the memory system may jump to the associated ending logical boundary 420, and may determine the logical addresses corresponding to the intermediate physical addresses algorithmically.

Additionally or alternatively, the memory system may use a backward reconstruction scheme. As part of the of the backward reconstruction scheme, the memory system may determine a last written page written after a checkpoint, such as the page 475-*d*. The memory system may then begin reading metadata associated with each physical address 405 of the page 475-*d* to determine the corresponding logical addresses, beginning with the last physical address 405 of the page 475-*d* and moving backwards. In some cases, if the metadata of a physical address 405 includes an indication of sequential data, such as a quantity of preceding sequential physical addresses 405, the memory system may refrain from reading metadata associated with the preceding sequential physical addresses, and instead generate the corresponding logical addresses algorithmically. In some cases, if the metadata of a physical address 405 includes an indication that the physical address 405 corresponds to an ending logical boundary 420, the memory system may jump to the associated starting logical boundary 415, and may determine the logical addresses corresponding to the intermediate physical addresses algorithmically.

In some examples, to determine the last written page written after a checkpoint, the memory system may perform a search operation, such as a binary search. For example, the memory system may access a first page of memory cells between (e.g., approximately half-way between) the physical address corresponding to the last written page written before the checkpoint and the physical address of the end of the block of memory cells containing the last written page written before the checkpoint. If the first page of memory cells contains data (e.g., has been written to), the memory system may access a second page of memory cells between the first page of memory cells and the physical address of the end of the block of memory cells. Alternatively, if the first page of memory cells has not been written to, the memory system may access a third page of memory cells between the starting logical address and the first page of memory cells, and so on, until the memory system has determined the last written page written after a checkpoint.

Figure 5:
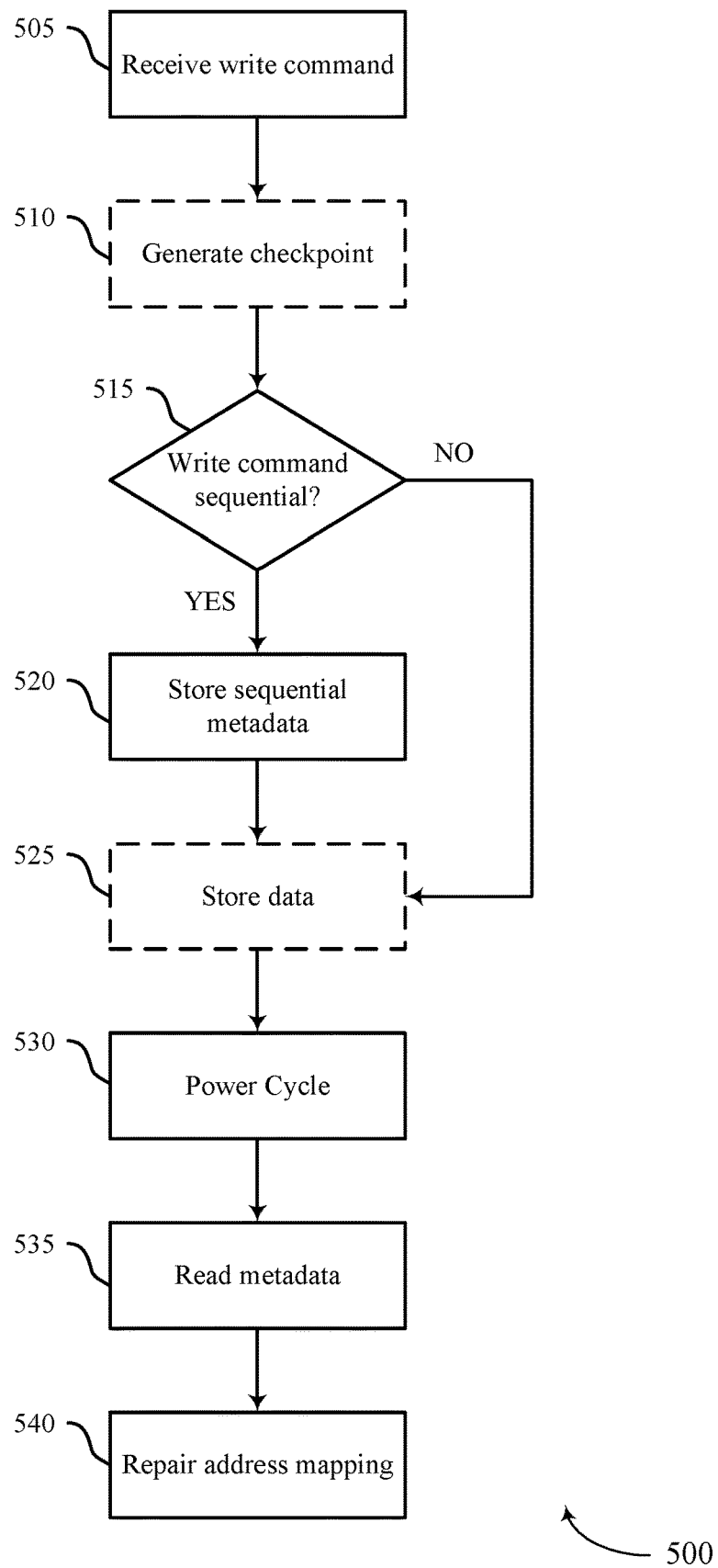
FIG. 5 illustrates an example of a process flow that supports techniques for memory system rebuild in accordance with examples as disclosed herein.

FIG. 5 illustrates an example of a process flow 500 that supports techniques for memory system rebuild in accordance with examples as disclosed herein. In some examples, process flow 500 may be implemented by aspects of the systems 300. The process flow 500 may include operations performed by a memory system, such as the memory system 310 described with reference to FIG. 3. In the following description of the process flow 500, the operations may be performed in a different order than the order shown. For example, specific operations may also be left out of the process flow 500, or other operations may be added to process flow 500.

The process flow 500 may illustrate an example of storing and using metadata indicating sequential data to update an address mapping as part of an APL rebuild operation. For example, the memory system may perform aspects of the process flow 500 as part of executing one or more write commands received from a host system. In some cases, the one or more write commands may be part of a sequential write operation. Accordingly, the memory system may execute the one or more commands while in a sequential write mode (e.g., as described with reference to FIG. 3), and may store an indication of the sequential write mode, for example in volatile memory, such as in the buffer.

In some cases, the process flow 500 may include receiving a write command. For example, at 505, the memory system may receive a write command and associated data from the host system. The write command may include metadata for the associated data, such as a logical address range for the data, a size of the data, or both. In some cases, the memory system may store the write command, along with one or more additional write commands, in a buffer or queue, such as the buffer 325 as described with reference to FIG. 3, prior performing the write command. While the write command or one or more additional commands are stored in the buffer, the memory system may be configured to access metadata associated with the commands, for example to determine whether the commands are part of a sequential write mode.

In some cases, the process flow 500 may include generating a checkpoint. For example, at 510, the memory system may generate a checkpoint in response to a quantity of indications of data stored in a volatile buffer of the memory system and associated with one or more write commands satisfying a threshold. In some cases, the indications of data may include metadata, such as a logical address range for the data, a size of the data, or both. For example, an indication of data may be an example of an entry of a changelog. Additionally or alternatively, the checkpoint may be initiated in response to closing a first block of memory cells (e.g., after completing or filling the block of memory cells with data) and opening a second block of memory cells.

In some cases, the process flow 500 may include determining whether data associated with the write command are part of a sequential write. For example, at 515, the memory system may determine whether the write command is part of a sequential write mode. In some cases, to determine whether the write command is part of the sequential write mode, the memory system may read a stored indicator of the sequential write mode. Additionally or alternatively, the memory system may determine whether to initiate the sequential write mode. For example, the memory system may determine whether logical addresses for data associated with the write command are sequential with one or more previously received write commands, the memory system may determine whether a size of the data or a logical address range of the data satisfies a threshold (e.g., as described with reference to FIG. 3), or a combination thereof.

In some cases, based on determining that the write command is part of a sequential write at 515, the process flow 500 may include storing an indication of the sequential write in metadata associated with data for the write command. For example, at 520, the memory system may generate and store the indication. In some cases, the memory system may operate according to a forward reconstruction scheme. In such cases, the indication may include a quantity of physical addresses associated with the data which are sequential. In some cases, the memory system may check a buffer for additional commands of the one or more commands to determine whether a second command includes sequential data (e.g., sequential to data associated with the write command). Accordingly, the memory system may include an indication of the sequential data of the second command in the metadata associated with the write command, for example by incrementing the value of a counter associated with the quantity of physical addresses which are sequential.

Additionally or alternatively, the memory system may operate according to a backward reconstruction scheme. In such cases, the indication may include a quantity of physical addresses associated with the sequential data preceding a last physical address for data associated with the write command. In some cases, the memory system may include a counter tracking the quantity. Accordingly, as part of storing the indication, the memory system may increment a value of the counter, such that metadata associated with a subsequent write command may use the updated counter value.

In some cases, the process flow 500 may include storing the data associated with the write command. For example, at 525, the memory system may store the data at one or more physical addresses corresponding to one or more logical addresses included in the write command. In some cases, the metadata may be stored in a same set of one or more physical addresses along with the data. Accordingly, the memory system may store the metadata and the data as part of a same programming operation. Additionally or alternatively, the memory system may store the metadata prior to storing the data, or the memory system may the data prior to storing the metadata.

In some cases, the process flow 500 may include a power cycle. For example, at 530, the memory system may undergo an asynchronous or unexpected power loss. Accordingly, the memory system may power back on. Upon determining the power on, the memory system may begin a power on procedure. As part of the power on procedure, the memory system may repair or rebuild an address mapping between logical and physical addresses, for example as part of an APL rebuild operation.

In some cases, as part of the APL rebuild operation, the memory system may read a last stored checkpoint, such as the checkpoint stored at 510 to determine the last valid address mapping (e.g., the most recently updated L2P table) and a logical address, a physical address, or both of the last written page of memory cells associated with the checkpoint (e.g., the last written page of memory cells written prior to the checkpoint). In some cases, the last written page of memory cells associated with the checkpoint may be referred to as a starting physical address. In some cases, an indication of the last written page of memory cells stored in the checkpoint may include a logical address of the last written page, a physical address of the last written page, or both. For example, if the indication includes a physical address of the last written page of memory cells, the memory system may determine the associated logical address of the last written page of memory cells using metadata stored along with the data of the last written page of memory cells (e.g., the associated logical address may be included in the metadata).

In some cases, the process flow 500 may include reading metadata. For example, at 535, if the memory system is operating according to a forward reconstruction scheme, the memory system may read the metadata stored at the page corresponding to the starting physical address. The memory system may then begin sequentially reading metadata associated with each physical address of the page to determine the corresponding logical addresses. In some cases, if the metadata of a physical address includes an indication of sequential data, such as a quantity of subsequent sequential physical addresses, the memory system may refrain from reading metadata associated with the subsequent sequential physical addresses, and instead generate the corresponding logical addresses algorithmically. In some cases, if the metadata of a physical address includes an indication that the physical address corresponds to a starting logical boundary, the memory system may jump to the associated ending logical boundary, and may determine the logical addresses corresponding to the intermediate physical addresses algorithmically.

Additionally or alternatively, the memory system may use a backward reconstruction scheme. As part of the of the backward reconstruction scheme, the memory system may determine a last written page written after a checkpoint. The memory system may then begin reading metadata associated with each physical address of the page to determine the corresponding logical addresses, beginning with the last physical address of the page and moving backwards. In some cases, if the metadata of a physical address includes an indication of sequential data, such as a quantity of preceding sequential physical addresses, the memory system may refrain from reading metadata associated with the preceding sequential physical addresses, and instead generate the corresponding logical addresses algorithmically. In some cases, if the metadata of a physical address includes an indication that the physical address corresponds to an ending logical boundary, the memory system may jump to the associated starting logical boundary, and may determine the logical addresses corresponding to the intermediate physical addresses algorithmically.

In some cases, the process flow 500 may include repairing the address mapping. For example, at 540, the memory system may use the intermediary logical addresses determined as part of the APL rebuild operation to update the address mapping to include a mapping between the intermediary logical addresses and corresponding physical addresses. In some cases, updating the address mapping may include adding, modifying or removing entries from the address mapping, or any combination thereof. Additionally or alternatively, updating the address mapping may include generating and storing a new address mapping (e.g., a new L2P table) which includes the mapping between the intermediary logical addresses and corresponding physical addresses.

In some cases, as part of the APL rebuild operation, the memory system may compress the address mapping. For example, the memory system may compress the address mapping if the memory system reads metadata corresponding to a starting logical boundary which included an indication that intermediate physical addresses (e.g., the physical addresses between the physical address corresponding to the starting logical boundary and the physical address corresponding to an ending logical boundary) are sequential. Accordingly, the address mapping may include a mapping for the starting logical boundary and associated physical address, a mapping for the ending logical boundary and associated physical address, or both. Additionally, the address mapping may include an indication of a size or quantity of physical addresses of the intermediate addresses.

Aspects of the process flow 500 may be implemented by a controller, among other components. Additionally or alternatively, aspects of the process flow 500 may be implemented as instructions stored in memory (e.g., firmware stored in a memory coupled with a host system 205 or the memory system 310). For example, the instructions, when executed by a controller (e.g., the controller 315), may cause the controller to perform the operations of the process flow 500.

Figure 6:
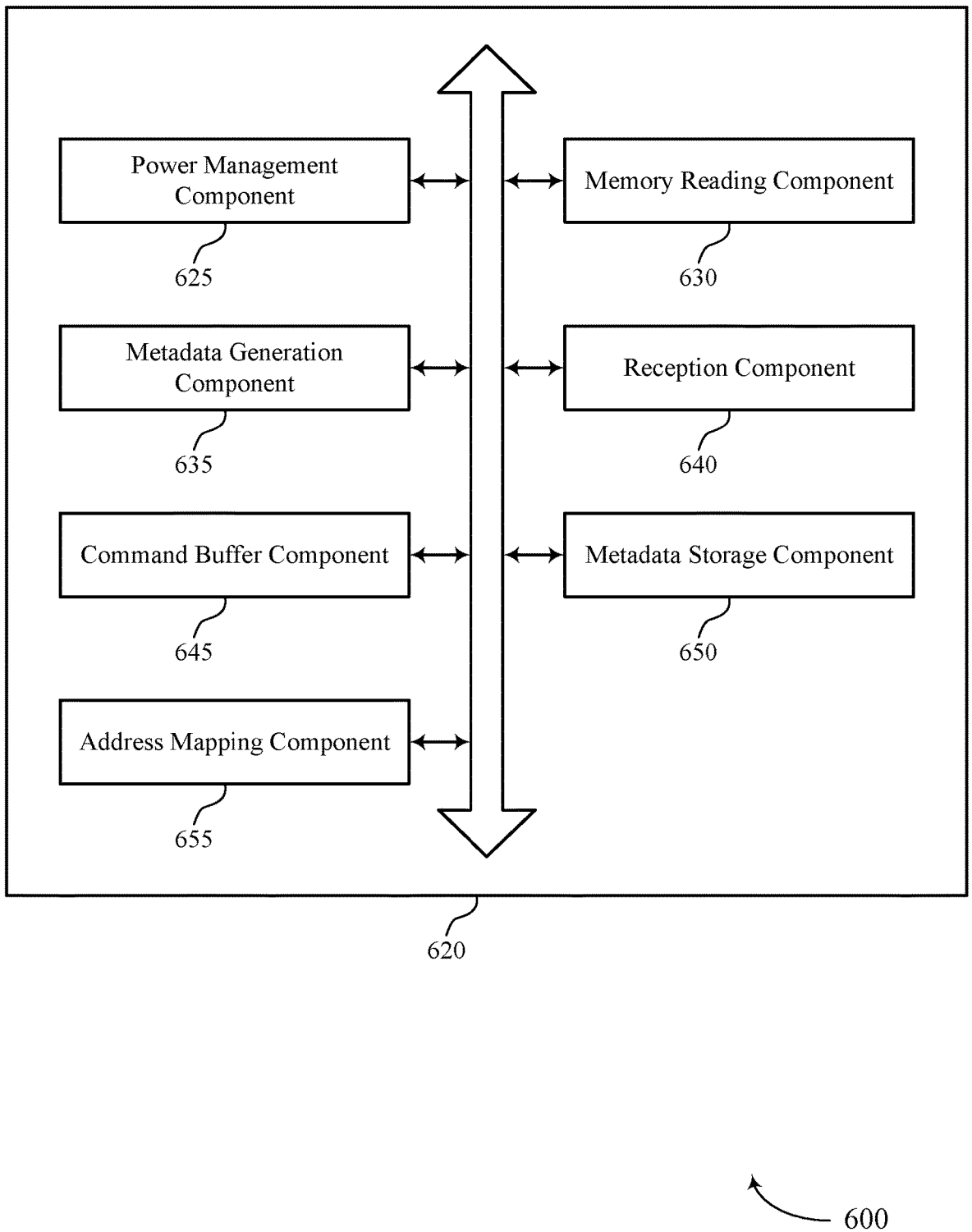
FIG. 6 shows a block diagram of a memory system that supports techniques for memory system rebuild in accordance with examples as disclosed herein.

FIG. 6 shows a block diagram 600 of a memory system 620 that supports techniques for memory system rebuild in accordance with examples as disclosed herein. The memory system 620 may be an example of aspects of a memory system as described with reference to FIGS. 1 through 5. The memory system 620, or various components thereof, may be an example of means for performing various aspects of techniques for memory system rebuild as described herein. For example, the memory system 620 may include a power management component 625, a memory reading component 630, a metadata generation component 635, a reception component 640, a command buffer component 645, a metadata storage component 650, an address mapping component 655, or any combination thereof. Each of these components may communicate, directly or indirectly, with one another (e.g., via one or more buses).

The power management component 625 may be configured as or otherwise support a means for determining a power on condition of a memory system. The memory reading component 630 may be configured as or otherwise support a means for reading, based at least in part on determining the power on condition, metadata stored at a first physical address of the memory system, the metadata including an indication that one or more logical addresses for data stored at one or more physical addresses are sequential and a parameter indicating a quantity of the one or more physical addresses. The metadata generation component 635 may be configured as or otherwise support a means for generating, based at least in part on reading the metadata, the one or more logical addresses based at least in part on the indication and the parameter.

In some examples, the address mapping component 655 may be configured as or otherwise support a means for updating a mapping between logical addresses associated with the data and the one or more physical addresses associated with the data based at least in part on generating the one or more logical addresses.

In some examples, to support updating the mapping, the address mapping component 655 may be configured as or otherwise support a means for compressing a portion of the mapping, the portion of the mapping including a subset of the one or more physical addresses, based at least in part on identifying that the subset includes a first logical boundary and a second logical boundary of the memory system.

In some examples, the first physical address is subsequent to at least a portion of the one or more physical addresses.

In some examples, the memory reading component 630 may be configured as or otherwise support a means for reading, based at least in part on determining the power on condition, second metadata stored at a second physical address of the memory system, where the second metadata includes an indication that the second physical address includes a starting logical boundary of the one or more physical addresses. In some examples, the memory reading component 630 may be configured as or otherwise support a means for determining to read the metadata stored at the first physical address based at least in part on reading the second metadata, where at least a portion of the one or more physical addresses are between the starting logical boundary and an ending logical boundary.

In some examples, the memory reading component 630 may be configured as or otherwise support a means for determining the first physical address based at least in part on performing a search on a block of memory cells of the memory system, where reading the metadata is based at least in part on determining the first physical address.

In some examples, to support performing the search, the address mapping component 655 may be configured as or otherwise support a means for determining a starting physical address based at least in part on a reading a checkpoint stored in a non-volatile portion of the memory system. In some examples, to support performing the search, the address mapping component 655 may be configured as or otherwise support a means for searching from the starting physical address to an end of the block of memory cells to determine the first physical address.

In some examples, the search includes a binary search.

The reception component 640 may be configured as or otherwise support a means for receiving, at a memory system, a write command. The command buffer component 645 may be configured as or otherwise support a means for storing data associated with the write command at a plurality of physical addresses. The metadata storage component 650 may be configured as or otherwise support a means for storing metadata associated with the write command at a first physical address of the plurality of physical addresses, the metadata including an indication that one or more logical addresses for at least a portion of the data stored at one or more physical addresses of the plurality of physical addresses are sequential.

In some examples, the reception component 640 may be configured as or otherwise support a means for receiving a second write command. In some examples, the address mapping component 655 may be configured as or otherwise support a means for determining whether one or more logical addresses for data associated with the second write command are sequential with the one or more logical addresses associated with the write command. In some examples, the metadata storage component 650 may be configured as or otherwise support a means for storing second metadata associated with the second write command based at least in part on the determining, the second metadata including an indication that the one or more logical addresses for data associated with the second write command are sequential with the one or more logical addresses associated with the write command.

In some examples, the address mapping component 655 may be configured as or otherwise support a means for incrementing a value of a counter indicating a quantity of sequential logical addresses based at least in part on the determining, where the second metadata further includes an indication of the value.

In some examples, the first physical address corresponds to a starting physical address of a page of memory cells of the memory system.

In some examples, the address mapping component 655 may be configured as or otherwise support a means for determining whether a subset of the plurality of physical addresses includes an ending physical address of a page of memory cells of the memory system. In some examples, the metadata storage component 650 may be configured as or otherwise support a means for storing metadata at the first physical address indicating that the subset is sequential.

In some examples, the address mapping component 655 may be configured as or otherwise support a means for determining whether a subset of the plurality of physical addresses includes a starting logical boundary and an ending logical boundary of the memory system.

In some examples, the command buffer component 645 may be configured as or otherwise support a means for determining whether one or more logical addresses for data associated with a second write command stored in a queue of the memory system are sequential with the one or more logical addresses associated with the write command. In some examples, the metadata storage component 650 may be configured as or otherwise support a means for storing second metadata associated with the second write command based at least in part on the determining, the second metadata including an indication that the one or more logical addresses for data associated with the second write command are sequential with the one or more logical addresses associated with the write command.

Figure 7:
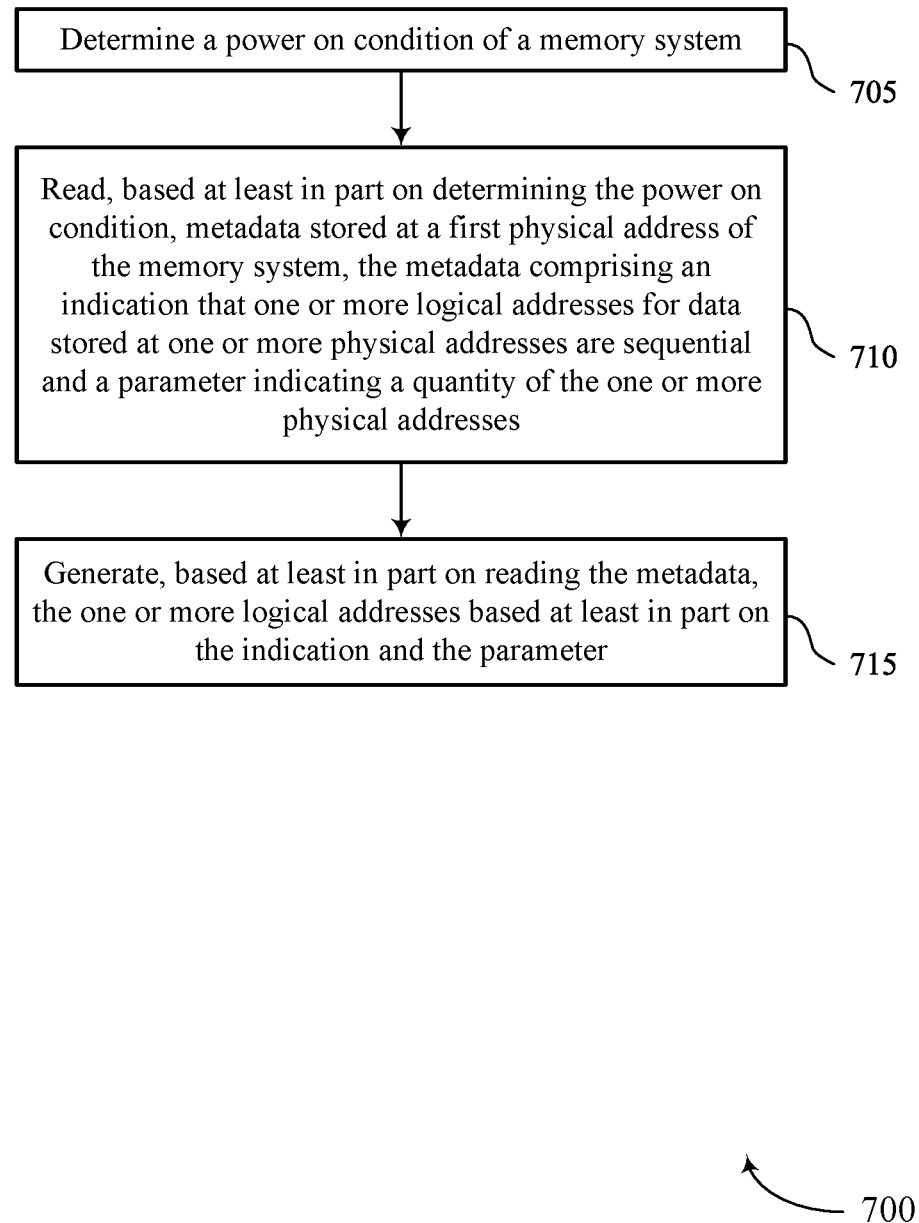
FIGS. 7 and 8 show flowcharts illustrating a method or methods that support techniques for memory system rebuild in accordance with examples as disclosed herein.

FIG. 7 shows a flowchart illustrating a method 700 that supports techniques for memory system rebuild in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include determining a power on condition of a memory system. The operations of 705 may be performed in accordance with examples as disclosed herein. In some examples, aspects of the operations of 705 may be performed by a power management component 625 as described with reference to FIG. 6.

At 710, the method may include reading, based at least in part on determining the power on condition, metadata stored at a first physical address of the memory system, the metadata including an indication that one or more logical addresses for data stored at one or more physical addresses are sequential and a parameter indicating a quantity of the one or more physical addresses. The operations of 710 may be performed in accordance with examples as disclosed herein. In some examples, aspects of the operations of 710 may be performed by a memory reading component 630 as described with reference to FIG. 6.

At 715, the method may include generating, based at least in part on reading the metadata, the one or more logical addresses based at least in part on the indication and the parameter. The operations of 715 may be performed in accordance with examples as disclosed herein. In some examples, aspects of the operations of 715 may be performed by a metadata generation component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining a power on condition of a memory system; reading, based at least in part on determining the power on condition, metadata stored at a first physical address of the memory system, the metadata including an indication that one or more logical addresses for data stored at one or more physical addresses are sequential and a parameter indicating a quantity of the one or more physical addresses; and generating, based at least in part on reading the metadata, the one or more logical addresses based at least in part on the indication and the parameter.

Aspect 2: The method, apparatus, or non-transitory computer-readable medium of aspect 1, further including operations, features, circuitry, logic, means, or instructions, or any combination thereof for updating a mapping between logical addresses associated with the data and the one or more physical addresses associated with the data based at least in part on generating the one or more logical addresses.

Aspect 3: The method, apparatus, or non-transitory computer-readable medium of aspect 2 where updating the mapping includes operations, features, circuitry, logic, means, or instructions, or any combination thereof for compressing a portion of the mapping, the portion of the mapping including a subset of the one or more physical addresses, based at least in part on identifying that the subset includes a first logical boundary and a second logical boundary of the memory system.

Aspect 4: The method, apparatus, or non-transitory computer-readable medium of any of aspects 1 through 3 where the first physical address is subsequent to at least a portion of the one or more physical addresses.

Aspect 5: The method, apparatus, or non-transitory computer-readable medium of aspect 4, further including operations, features, circuitry, logic, means, or instructions, or any combination thereof for reading, based at least in part on determining the power on condition, second metadata stored at a second physical address of the memory system, where the second metadata includes an indication that the second physical address includes a starting logical boundary of the one or more physical addresses and determining to read the metadata stored at the first physical address based at least in part on reading the second metadata, where at least a portion of the one or more physical addresses are between the starting logical boundary and an ending logical boundary.

Aspect 6: The method, apparatus, or non-transitory computer-readable medium of any of aspects 4 through 5, further including operations, features, circuitry, logic, means, or instructions, or any combination thereof for determining the first physical address based at least in part on performing a search on a block of memory cells of the memory system, where reading the metadata is based at least in part on determining the first physical address.

Aspect 7: The method, apparatus, or non-transitory computer-readable medium of aspect 6 where performing the search includes operations, features, circuitry, logic, means, or instructions, or any combination thereof for determining a starting physical address based at least in part on a reading a checkpoint stored in a non-volatile portion of the memory system and searching from the starting physical address to an end of the block of memory cells to determine the first physical address.

Aspect 8: The method, apparatus, or non-transitory computer-readable medium of any of aspects 6 through 7 where the search includes a binary search.

Figure 8:
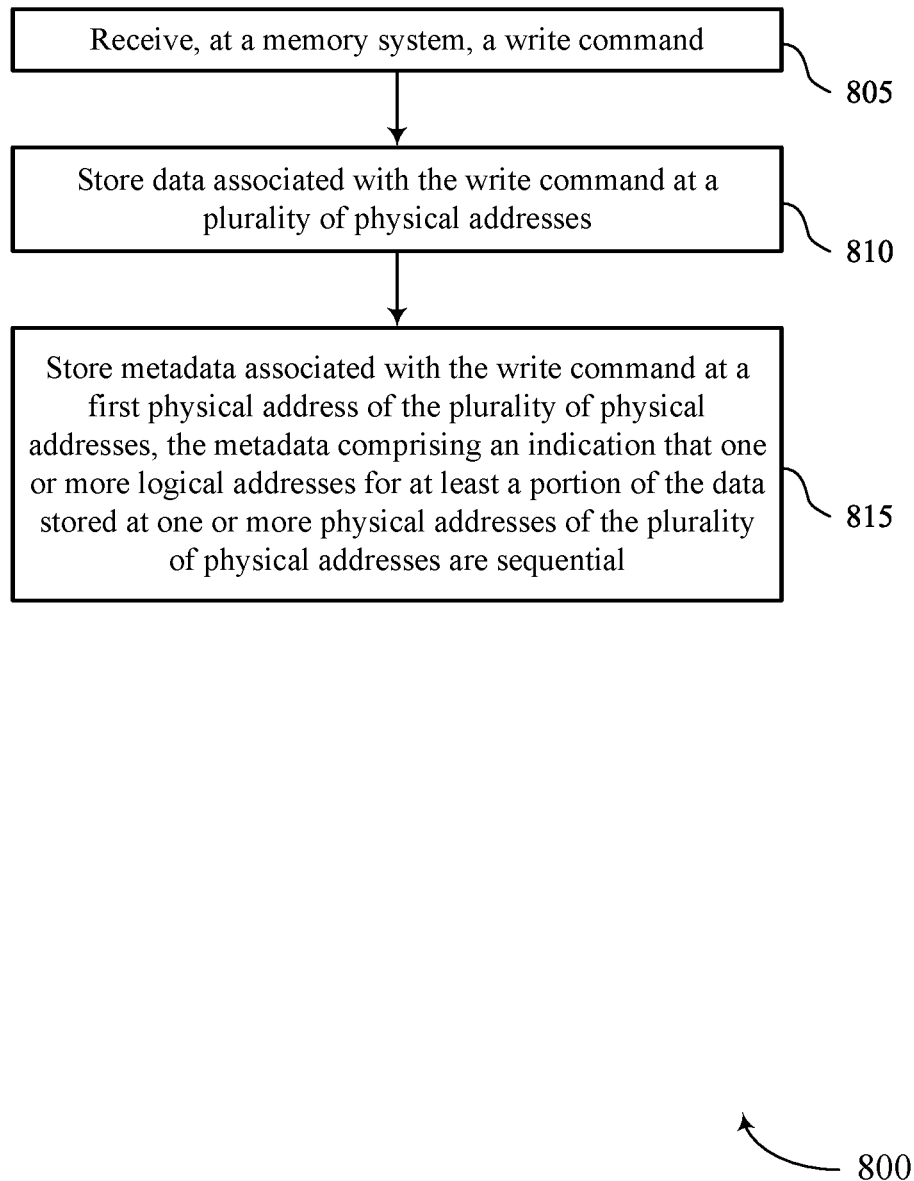

FIG. 8 shows a flowchart illustrating a method 800 that supports techniques for memory system rebuild in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include receiving, at a memory system, a write command. The operations of 805 may be performed in accordance with examples as disclosed herein. In some examples, aspects of the operations of 805 may be performed by a reception component 640 as described with reference to FIG. 6.

At 810, the method may include storing data associated with the write command at a plurality of physical addresses. The operations of 810 may be performed in accordance with examples as disclosed herein. In some examples, aspects of the operations of 810 may be performed by a command buffer component 645 as described with reference to FIG. 6.

At 815, the method may include storing metadata associated with the write command at a first physical address of the plurality of physical addresses, the metadata including an indication that one or more logical addresses for at least a portion of the data stored at one or more physical addresses of the plurality of physical addresses are sequential. The operations of 815 may be performed in accordance with examples as disclosed herein. In some examples, aspects of the operations of 815 may be performed by a metadata storage component 650 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for receiving, at a memory system, a write command; storing data associated with the write command at a plurality of physical addresses; and storing metadata associated with the write command at a first physical address of the plurality of physical addresses, the metadata including an indication that one or more logical addresses for at least a portion of the data stored at one or more physical addresses of the plurality of physical addresses are sequential.

Aspect 10: The method, apparatus, or non-transitory computer-readable medium of aspect 9, further including operations, features, circuitry, logic, means, or instructions, or any combination thereof for receiving a second write command; determining whether one or more logical addresses for data associated with the second write command are sequential with the one or more logical addresses associated with the write command; and storing second metadata associated with the second write command based at least in part on the determining, the second metadata including an indication that the one or more logical addresses for data associated with the second write command are sequential with the one or more logical addresses associated with the write command.

Aspect 11: The method, apparatus, or non-transitory computer-readable medium of aspect 10, further including operations, features, circuitry, logic, means, or instructions, or any combination thereof for incrementing a value of a counter indicating a quantity of sequential logical addresses based at least in part on the determining, where the second metadata further includes an indication of the value.

Aspect 12: The method, apparatus, or non-transitory computer-readable medium of any of aspects 9 through 11 where the first physical address corresponds to a starting physical address of a page of memory cells of the memory system.

Aspect 13: The method, apparatus, or non-transitory computer-readable medium of any of aspects 9 through 12, further including operations, features, circuitry, logic, means, or instructions, or any combination thereof for determining whether a subset of the plurality of physical addresses includes an ending physical address of a page of memory cells of the memory system and storing metadata at the first physical address indicating that the subset is sequential.

Aspect 14: The method, apparatus, or non-transitory computer-readable medium of any of aspects 9 through 13, further including operations, features, circuitry, logic, means, or instructions, or any combination thereof for determining whether a subset of the plurality of physical addresses includes a starting logical boundary and an ending logical boundary of the memory system.

Aspect 15: The method, apparatus, or non-transitory computer-readable medium of any of aspects 9 through 14, further including operations, features, circuitry, logic, means, or instructions, or any combination thereof for determining whether one or more logical addresses for data associated with a second write command stored in a queue of the memory system are sequential with the one or more logical addresses associated with the write command and storing second metadata associated with the second write command based at least in part on the determining, the second metadata including an indication that the one or more logical addresses for data associated with the second write command are sequential with the one or more logical addresses associated with the write command.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
processing circuitry associated with one or more memory devices and configured to cause the memory system to:
   determine a power on condition of the memory system;
   read, based at least in part on determining the power on condition, metadata stored at a first physical address of the memory system, the metadata comprising an indication that one or more logical addresses for data stored prior to the power on condition at one or more physical addresses are sequential and a parameter indicating a quantity of the one or more physical addresses;
   generate, based at least in part on reading the metadata, the one or more logical addresses based at least in part on the indication and the parameter; and
   compress a portion of a mapping between logical addresses associated with the data and the one or more physical addresses associated with the data, the portion of the mapping comprising a subset of the one or more physical addresses, based at least in part on generating the one or more logical addresses and identifying that the subset comprises a first logical boundary and a second logical boundary of the memory system.

2. The memory system of claim 1, wherein the first physical address is subsequent to at least a portion of the one or more physical addresses.

3. The memory system of claim 2, wherein the processing circuitry is further configured to cause the memory system to:
   read, based at least in part on determining the power on condition, second metadata stored at a second physical address of the memory system, wherein the second metadata comprises an indication that the second physical address comprises a starting logical boundary of the one or more physical addresses; and
   determine to read the metadata stored at the first physical address based at least in part on reading the second metadata, wherein at least a portion of the one or more physical addresses are between the starting logical boundary and an ending logical boundary.

4. The memory system of claim 2, wherein the processing circuitry is further configured to cause the memory system to:
   determine the first physical address based at least in part on performing a search on a block of memory cells of the memory system, wherein reading the metadata is based at least in part on determining the first physical address.

5. The memory system of claim 4, wherein performing the search is configured to cause the memory system to:
   determine a starting physical address based at least in part on a reading a checkpoint stored in a non-volatile portion of the memory system; and
   search from the starting physical address to an end of the block of memory cells to determine the first physical address.

6. The memory system of claim 4, wherein the search comprises a binary search.

7. A memory system, comprising:
processing circuitry associated with one or more memory devices, wherein the processing circuitry is configured to cause the memory system to:
   receive, at the memory system, a write command;
   store data associated with the write command at a plurality of sequential physical addresses;
   store metadata associated with the write command at a sequentially first physical address of the plurality of sequential physical addresses, the metadata comprising an indication that one or more logical addresses for at least a portion of the data stored at one or more sequential physical addresses of the plurality of sequential physical addresses are sequential;
   receive a second write command;
   determine whether one or more logical addresses for data associated with the second write command are sequential with the one or more logical addresses associated with the write command;
   increment a value of a counter indicating a quantity of sequential logical addresses based at least in part on the determining; and
   store second metadata associated with the second write command based at least in part on the determining, the second metadata comprising an indication that the one or more logical addresses for data associated with the second write command are sequential with the one or more logical addresses associated with the write command and an indication of the value of the counter.

8. The memory system of claim 7, wherein the sequentially first physical address corresponds to a starting physical address of a page of memory cells of the memory system.

9. The memory system of claim 7, wherein the processing circuitry is further configured to cause the memory system to:
   determine whether a subset of the plurality of sequential physical addresses comprises an ending physical address of a page of memory cells of the memory system; and
   store the metadata at the sequentially first physical address indicating that the subset is sequential.

10. The memory system of claim 7, wherein the processing circuitry is further configured to cause the memory system to:

determine whether a subset of the plurality of sequential physical addresses comprises a starting logical boundary and an ending logical boundary of the memory system.

11. The memory system of claim 7, wherein the processing circuitry is further configured to cause the memory system to:
  determine whether the one or more logical addresses for data associated with the second write command stored in a queue of the memory system are sequential with the one or more logical addresses associated with the write command; and
  store the second metadata associated with the second write command based at least in part on the determining.

12. A non-transitory computer-readable medium storing code, the code comprising instructions executable by processing circuitry to:
  determine a power on condition of a memory system;
  read, based at least in part on determining the power on condition, metadata stored at a first physical address of the memory system, the metadata comprising an indication that one or more logical addresses for data stored prior to the power on condition at one or more physical addresses are sequential and a parameter indicating a quantity of the one or more physical addresses;
  generate, based at least in part on reading the metadata, the one or more logical addresses based at least in part on the indication and the parameter; and
  compress a portion of a mapping between logical addresses associated with the data and the one or more physical addresses associated with the data, the portion of the mapping comprising a subset of the one or more physical addresses, based at least in part on generating the one or more logical addresses and identifying that the subset comprises a first logical boundary and a second logical boundary of the memory system.

13. The non-transitory computer-readable medium of claim 12, wherein the first physical address is subsequent to at least a portion of the one or more physical addresses.

14. The non-transitory computer-readable medium of claim 13, wherein the instructions are further executable by the processing circuitry to:
  read, based at least in part on determining the power on condition, second metadata stored at a second physical address of the memory system, wherein the second metadata comprises an indication that the second physical address comprises a starting logical boundary of the one or more physical addresses; and
  determine to read the metadata stored at the first physical address based at least in part on reading the second metadata, wherein at least a portion of the one or more physical addresses are between the starting logical boundary and an ending logical boundary.

15. The non-transitory computer-readable medium of claim 13, wherein the instructions are further executable by the processing circuitry to:
  determine the first physical address based at least in part on performing a search on a block of memory cells of the memory system, wherein reading the metadata is based at least in part on determining the first physical address.

16. The non-transitory computer-readable medium of claim 15, wherein the instructions to perform the search are executable by the processing circuitry to:
  determine a starting physical address based at least in part on a reading a checkpoint stored in a non-volatile portion of the memory system; and
  search from the starting physical address to an end of the block of memory cells to determine the first physical address.

17. The non-transitory computer-readable medium of claim 15, wherein the search comprises a binary search.

* * * * *